(12) United States Patent
Fujisawa

(10) Patent No.: US 6,959,071 B2
(45) Date of Patent: Oct. 25, 2005

(54) PHONE-CALL APPARATUS, PHONE-CALL METHOD, COMMUNICATION CONTROL APPARATUS, COMMUNICATION CONTROL METHOD, AND PROGRAM

(75) Inventor: Naoki Fujisawa, Tokyo (JP)

(73) Assignee: Sony Corporation, Tokyo (JP)

( * ) Notice: Subject to any disclaimer, the term of this patent is extended or adjusted under 35 U.S.C. 154(b) by 432 days.

(21) Appl. No.: 10/145,482

(22) Filed: May 13, 2002

(65) Prior Publication Data

US 2002/0186822 A1 Dec. 12, 2002

(30) Foreign Application Priority Data

May 14, 2001 (JP) .............................. 2001-143870

(51) Int. Cl.[7] .............................................. H04M 1/64
(52) U.S. Cl. ............................ 379/68; 379/71; 379/72; 379/76; 379/88.07; 379/88.12
(58) Field of Search ........................... 379/67.1, 68, 76, 379/88.17, 71, 78, 79, 80, 88.07, 88.12; 455/412, 455/413, 553, 567, 572; 340/693.3, 692

(56) References Cited

U.S. PATENT DOCUMENTS 4,481,382 A * 11/1984 Villa-Real ................ 455/556.1
5,790,957 A * 8/1998 Heidari ..................... 455/553.1
2002/0181671 A1 * 12/2002 Logan

FOREIGN PATENT DOCUMENTS

EP          WO0115410 A2 *  3/2001  ........... H04M 1/00

* cited by examiner

Primary Examiner—Allan Hoosain
(74) Attorney, Agent, or Firm—Frommer Lawrence & Haug LLP; William S. Frommer; Thomas F. Presson

(57) ABSTRACT

Disclosed herein are a phone-call apparatus, a phone-call method, a communication control apparatus, a communication control method, and a program. In a phone-integrated terminal, a CPU controls a communication unit to implement a phone conversation with a communication partner through a communication network. An audio signal input to a microphone of an input unit is transmitted to the communication partner by way of the communication unit. On the other hand, an audio signal transmitted from the communication partner is output to earphones or a speaker in an audio reproduction unit. The audio signal output to the earphones or the speaker in the audio reproduction unit is superposed on a musical signal reproduced from a memory card. Thus, the user can listen to not only a voice of the communication partner but also music reproduced as BGM during the phone conversation. As a result, the user can enjoy the phone conversation.

11 Claims, 9 Drawing Sheets

USER A

USER B

USER A
(USER B)

PHONE-CALL APPARATUS, PHONE-CALL METHOD, COMMUNICATION CONTROL APPARATUS, COMMUNICATION CONTROL METHOD, AND PROGRAM

BACKGROUND OF THE INVENTION

In general, the present invention relates to a phone-call apparatus, a phone-call method, a communication control apparatus, a communication control method, and a program. More particularly, the present invention relates to a phone-call apparatus, a phone-call method, a communication control apparatus, a communication control method, and a program that make telephone conversations enjoyable.

In recent years, cellular phones have been becoming popular, allowing a large number of users to have phone conversations with a high degree of freedom at any place.

At the same time, portable CD players and MD (Mini Disc) players have been also becoming popular, allowing the user to enjoy music while walking.

Since these devices are independent of each other, however, the user must carry both a cellular phone and a player in order to listen to music and have a phone conversation at the same time.

In order to solve this problem, a memory card used for recording musical data is mounted on a cellular phone sold in the market so that, by carrying only the cellular phone, the user can enjoy music and, if necessary, can have a phone conversation while walking.

With the cellular phone provided with a memory card as described above, however, when a phone call arrives while the user is reproducing a piece of music, for example, the operation to reproduce the music is suspended and only a voice of the phone-conversation partner is heard. As a result, the reproduction operation of the music is discontinued, raising a problem that an enjoyable telephone conversation cannot be held.

SUMMARY OF THE INVENTION

It is thus an object of the present invention addressing the problems described above to allow the user to have a phone conversation while listening to music so as to more enjoy the conversation.

To achieve the above object, according to a first aspect of the present invention, there is provided a phone-call apparatus including: storage means for storing content data; phone-conversation means for implementing a phone conversation with a communication partner; reproduction means for reproducing the content data stored in the storage means; and control means for controlling a reproduction level of a content reproduced by the reproduction means to make both a voice of the partner and a reproduction sound of the content audible during conversation by the phone-conversation means.

According to a second aspect of the present invention, there is provided a phone-call method including: a storing step of storing content data;

a phone-conversation step of implementing a phone conversation with a communication partner; a reproduction step of reproducing the content data stored at the storing step; and a control step of controlling a reproduction level of a content reproduced at the reproduction step to make both a voice of the partner and a reproduction sound of the content audible during conversation at the phone-conversation step.

According to a third aspect of the present invention, there is provided a program to be executed by a computer including: a storing step of storing content data; a phone-conversation step of implementing a phone conversation with a communication partner; a reproduction step of reproducing the content data stored at the storing step; and a control step of controlling a reproduction level of a content reproduced at the reproduction step to make both a voice of the partner and a reproduction sound of the content audible during conversation at the phone-conversation step.

With these configurations, the reproduction level of a content is controlled so that both a voice received from a communication partner and a reproduced sound of a content can be heard during a phone conversation. Thus, the conversation can be made more enjoyable. As a result, even if the phone conversation is held for a long time, both the communication parties are prevented from getting tired of each other.

According to a fourth aspect of the present invention, there is provided a communication control apparatus including: controlling means for controlling phone conversations among a plurality of phone-call apparatus; detection means for detecting a transfer of content data from any specific one of the phone-call apparatus to any other one of the phone-call apparatus; and accounting means for adding a fee of copying a content to a phone-call fee to be charged to either the specific phone-call apparatus or the other phone-call apparatus on the basis of a detection result produced by the detection means.

According to a fifth aspect of the present invention, there is provided a communication control method including: a controlling step of controlling phone conversations among a plurality of phone-call apparatus; a detection step of detecting a transfer of content data from any specific one of the phone-call apparatus to any other one of the phone-call apparatus; and an accounting step of adding a fee of copying a content to a phone-call fee to be charged to either the specific phone-call apparatus or the other phone-call apparatus on the basis of a detection result produced at the detection step.

According to a sixth aspect of the present invention, there is provided a program to be executed by a computer including: a controlling step of controlling phone conversations among a plurality of phone-call apparatus; a detection step of detecting a transfer of content data from any specific one of the phone-call apparatus to any other one of the phone-call apparatus; and an accounting step of adding a fee of copying a content to a phone-call fee to be charged to either the specific phone-call apparatus or the other phone-call apparatus on the basis of a detection result produced at the detection step.

With these configurations, an accounting process is carried out to add a fee for copying a content to a communication charge of the terminal so that an illegal copying operation can be avoided.

The above and other objects, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENTS

Figure 1:
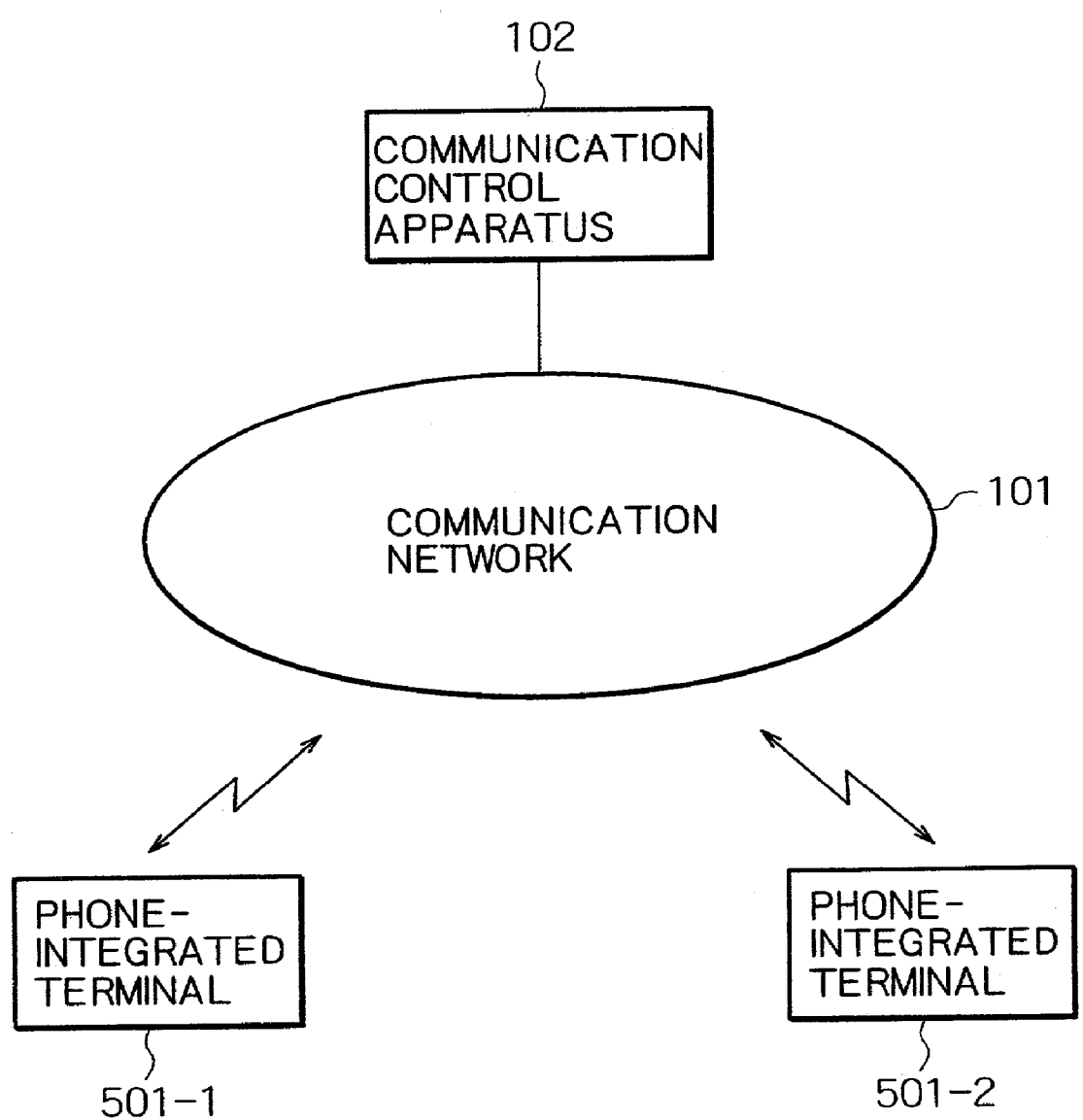
FIG. 1 is a diagram showing a typical configuration of a network system to which the present invention is applied.

FIG. 1 is a diagram showing a typical configuration of a network system to which the present invention is applied. In this typical configuration, a phone-integrated terminal 501-1 is connected to another phone-integrated terminal 501-2 by a communication network 101. In addition, a communication control apparatus 102 is connected to the communication network 101. The communication control apparatus 102 controls a telephone conversation between the phone-integrated terminal 501-1 and the other phone-integrated terminal 501-2.

Figure 2:
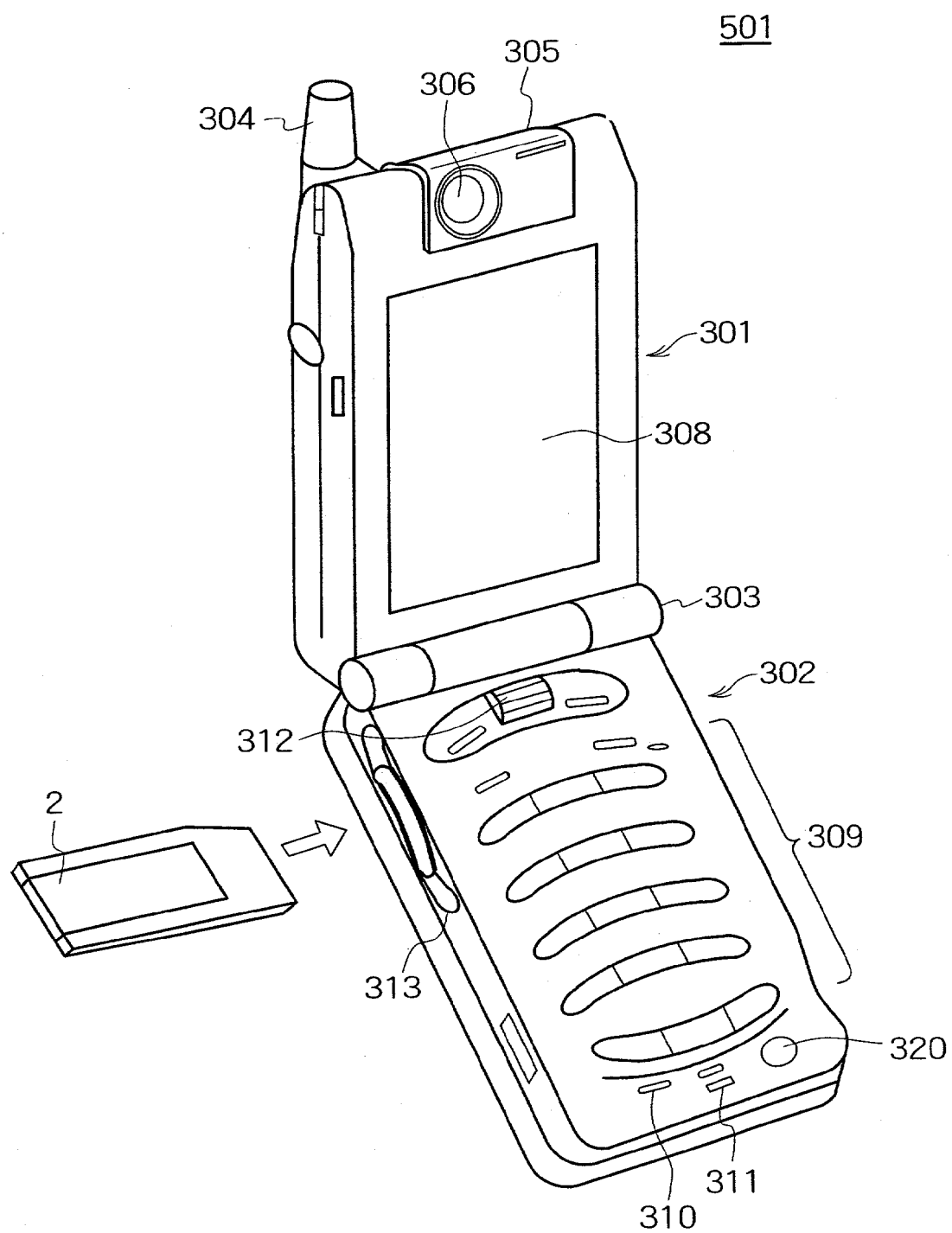
FIG. 2 is a diagram showing a perspective view of an external configuration of a phone-integrated terminal used in the network system shown in FIG. 1.

FIG. 2 is a diagram showing an external configuration of the phone-integrated terminal 501 shown in FIG. 1. The phone-integrated terminal 501 is a generic name, which is used if there is no need to distinguish the phone-integrated terminal 501-1 from the phone-integrated terminal 501-2 or vice versa. As shown in FIG. 2, the phone-integrated terminal 501 has a display unit 301 and a main unit 302. The display unit 301 can be lapped over the main unit 302 by rotating the display unit 301 around a hinge unit 303.

The display unit 301 has an antenna 304 for reception and transmission. The antenna 304 can be inserted into and pulled out from the display unit 301. The phone-integrated terminal 501 exchanges radio waves with a stationary radio station serving as a base station, being connected to the communication network 101 to communicate with another phone set.

In addition, on the top center of the display unit 301, the display unit 301 has a camera unit 305, which can be rotated with a high degree of freedom over an angular range of about 180 degrees. The phone-integrated terminal 501 photographs a photographing object by using a CCD (Charge-Coupled Device) camera 306 of the camera unit 305.

Figure 3:
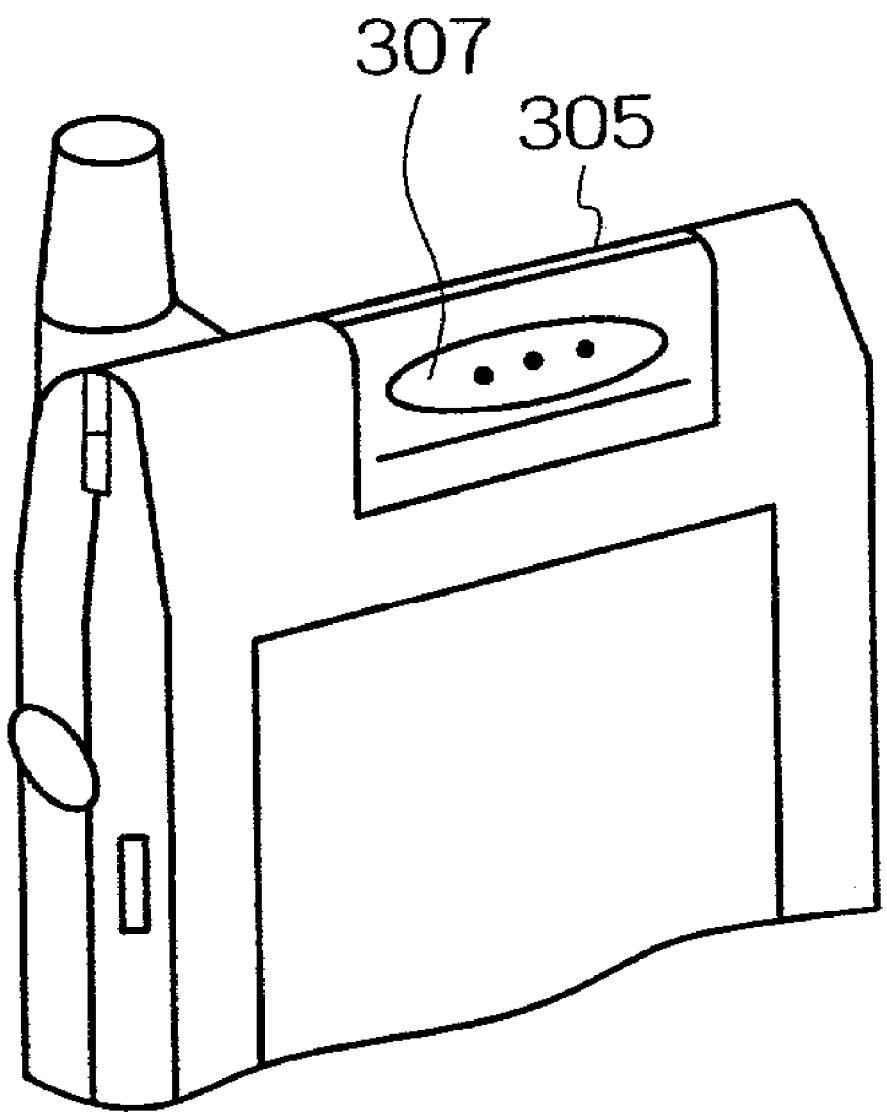
FIG. 3 is a diagram showing a perspective view of the configuration of a portion of the rear part of the phone-integrated terminal shown in FIG. 2.

If the user turns the camera unit 305 by 180 degrees, as shown in FIG. 3, the speaker 307 provided at a position on the side opposite to the camera unit 305 is positioned on the front surface of the display unit 301. With the camera unit 305 turned to this orientation, the phone-integrated terminal 501 is put in a state for a normal audio communication.

As described above, on the front surface of the display unit 301, the liquid-crystal display 308 is provided. The liquid-crystal display screen 308 displays information such as a state of reception of radio waves and an amount of residual charge left in a battery, names and phone numbers of communication partners, which are programmed on an address list, a history of transmissions in addition to contents of an e-mail, a simple home page, a picture taken by the CCD camera 306 employed in the camera unit 305 or an image of a map showing routes.

On the front surface of the main unit 302, on the other hand, there are provided operation keys 309 such as numeric keys "0" to "9", a call key, a redial key, a clear key and an electronic mail key 309. A power-supply button 320, which is a button of the operation keys 309, is operated to turn on or off a power supply and to terminate a phone conversation. A variety of commands are entered to the phone-integrated terminal 501 by operating the operation keys 309.

Beneath the operation keys 309 on the main unit 302, a memo button 310 and a microphone 311 are provided. When the memo button 310 is operated, the phone-integrated terminal 501 records a voice of the communication partner currently having a phone conversation with the user. The phone-integrated terminal 501 collects the voice of the user on conversation by the microphone 311.

In addition, a jog dial 312 that can be rotated with a high degree of freedom is provided on the surface of the main unit 302 above the operation keys 309 of the main unit 302, protruding slightly from the surface. Operations to rotate the jog dial 312 causes the phone-integrated terminal 501 to carry out a variety of operations such as operations to scroll an address list or an electronic mail, which is displayed on the liquid-crystal display screen 308, to flip through a simple home page or to scroll a screen.

For example, in accordance with an operation carried out by the user to rotate the jog dial 312, the main unit 302 selects a desired phone number among a plurality of phone numbers programmed on the phone-number list appearing on the liquid-crystal display screen 308 and, when the jog dial 312 is pressed in the inward direction of the main unit 302, the selected phone number is confirmed and a phone call is made automatically to the confirmed number.

It should be noted that a battery pack not shown in the figure is accommodated on the rear-surface side of the main unit 302. When the power-supply button 320 is turned on, the battery pack supplies power to circuits, initiating the phone-integrated terminal 501 into an operatable state.

On the upper portion on the left-side surface of the main unit 302, there is provided a memory-card slot 313 for mounting a memory card 2, which can be inserted and pulled out with a high degree of freedom. When a memory card 2 used for recording musical data is mounted on the memory-card slot 313, the phone-integrated terminal 501 reads out (reproduces) the musical data from the memory card 2, outputting the data to a speaker 307 or earphones not shown in the figure.

When the memo button 310 is pressed, the phone-integrated terminal 501 records the voice of a communication partner currently having a phone conversation with the user onto the memory card 2 mounted on the phone-integrated terminal 501. In accordance with operations carried out by the user, the phone-integrated terminal 501 records an electronic mail, a simple home page and a picture taken by the CCD camera 306 into the memory card 2 mounted on the phone-integrated terminal 501.

The memory card 2 is a memory stick (a trademark), which is a kind of flash memory card developed by Sony Corp. serving as the applicant for a patent of the present invention. The memory card 2 is a flash-memory device accommodated in a small and thin plastic case with dimensions of 21.5 mm (length)×50 mm (width)×2.8 mm (thickness). A flash-memory device is a kind of EEPROM (Electrically Erasable and Programmable Read-Only Memory), a non-volatile memory, which can be electrically rewritten and erased. Provided with 10 pins, the memory card 2 allows various kinds of data such as a picture and music to be written into the memory card 2 or read out from the memory card 2 through the 10 pins.

In addition, the memory card 2 adopts its own original serial protocol, which maintains compatibility with the host apparatus even if specifications of the embedded flash memory are changed due to typically a big increase in storage capacity. The memory card 2 displays high performance such as a maximum write speed of 1.5 [MB/S] and a maximum read speed of 2.45 [MB/S]. The memory card 2 also assures high reliability by including an erasure prevention switch.

Having a configuration allowing such a memory card 2 to be mounted, the phone-integrated terminal 501 is capable of sharing data with another apparatus such as a personal computer.

Figure 4:
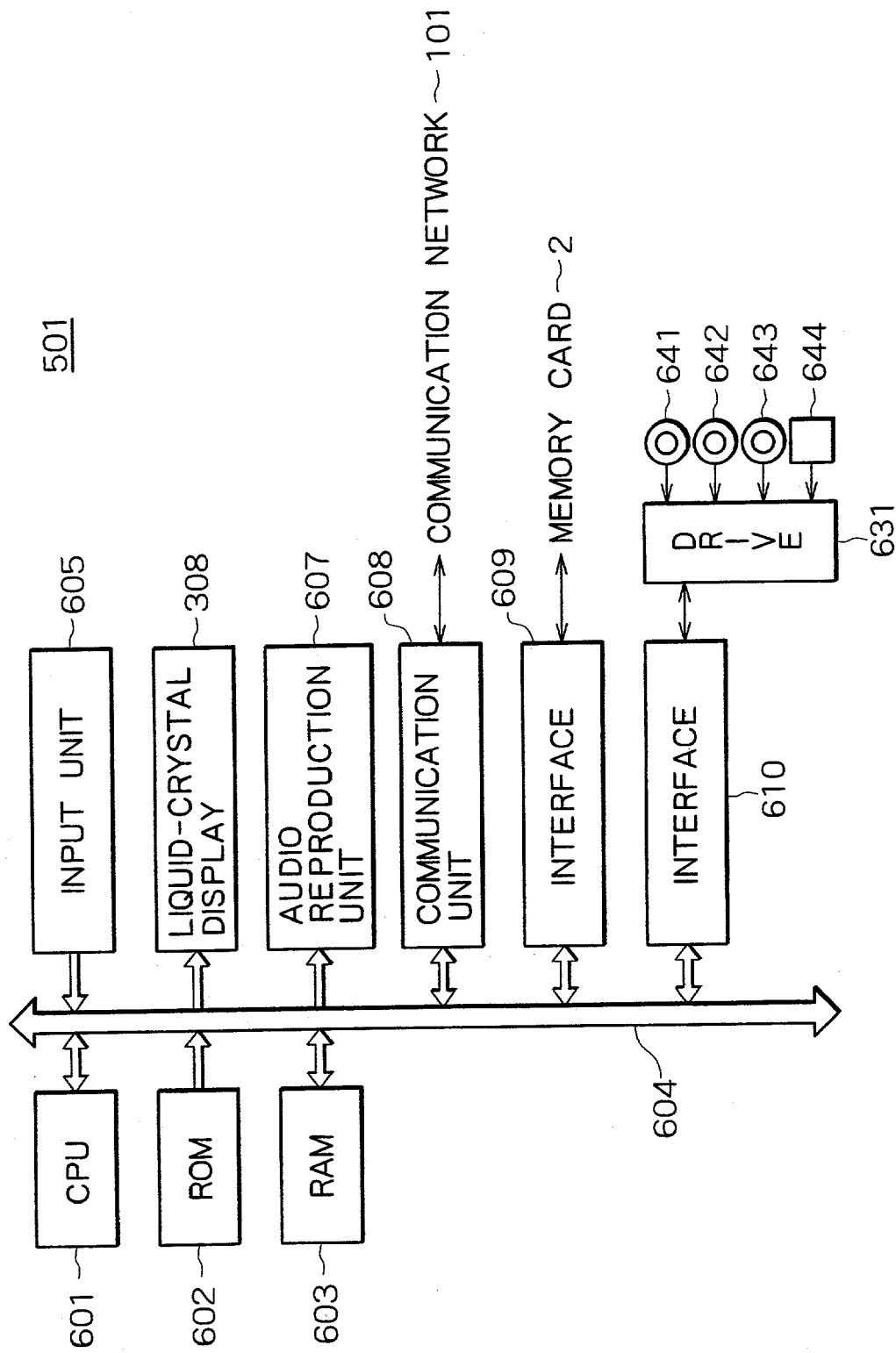
FIG. 4 is a block diagram showing the internal configuration of the phone-integrated terminal shown in FIG. 2.

FIG. 4 is an explanatory diagram showing the internal configuration of the phone-integrated terminal 501. A CPU (Central Processing Unit) 601 actually executes a variety of programs stored in a ROM (Read-Only Memory) 602 or a RAM (Random-Access Memory) 603. The ROM 602 is a non-volatile memory such as an EEPROM (Electrically Erasable and Programmable Read-Only Memory) or a flash memory. In general, the ROM 602 is used for storing programs to be executed by the CPU 601 and fixed data of parameters used in processing. The RAM 603 is an SRAM (Static RAM), into which a program is loaded to be executed by the CPU 601. The RAM 603 is also used for storing parameters that change in the course of program execution.

An input unit 605 includes the operation keys 309 and a microphone 311. The input unit 605 is operated by the user when the user enters a variety of commands to the CPU 601 or enters data such as a voice. The liquid-crystal display screen 308 displays various kinds of information such as a text or an image.

An audio reproduction unit 607 includes a speaker 307 and earphones. The audio reproduction unit 607 reproduces data of a communication partner's voice supplied by a communication unit 608. The audio reproduction unit 607 also reproduces a content received from the memory card 2 through an interface 609 to output a sound representing the content.

Connected to the communication network 101, the communication unit 608 accommodates data supplied by the CPU 601 or data representing a voice output by the user through the input unit 605 in a packet having a predetermined format. Examples of the data supplied by the CPU 601 are musical data and data of a content. The communication unit 608 transmits the packet to the communication partner by way of the communication network 101. On the other hand, the communication unit 608 receives a packet from the communication partner through the communication network 101. The communication unit 608 supplies data accommodated in a packet received from the communication partner to the CPU 601, the RAM 603, the audio reproduction unit 607 or the interface 609. Examples of the data accommodated in the received packet are data of a content or data of a voice output by the communication partner.

The interface 609 stores data supplied from the CPU 601, the RAM 603 or the communication unit 608 onto the memory card 2 mounted on the phone-integrated terminal 501. On the other hand, the interface 609 reads out data such as a content from the memory card 2 mounted on the phone-integrated terminal 501 and supplies the data to the CPU 601, the RAM 603 or the audio reproduction unit 607.

Another interface 610 is connected to an external drive 631. In the drive 631, a magnetic disc 641, an optical disc 642 (including a CD-ROM), a magneto-optical disc 643 or a semiconductor memory 644 is mounted. The drive 631 reads out data or a program from the magnetic disc 641, the optical disc 642, the magneto-optical disc 643 or the semiconductor memory 644 and supplies the data or the program to the ROM 602 or the RAM 603 by way of the interface 610 and a bus 604 connected to the ROM 602 and the RAM 603.

The components ranging from the CPU 601 to the interface 610 are connected to each other by a bus 604.

Figure 5:
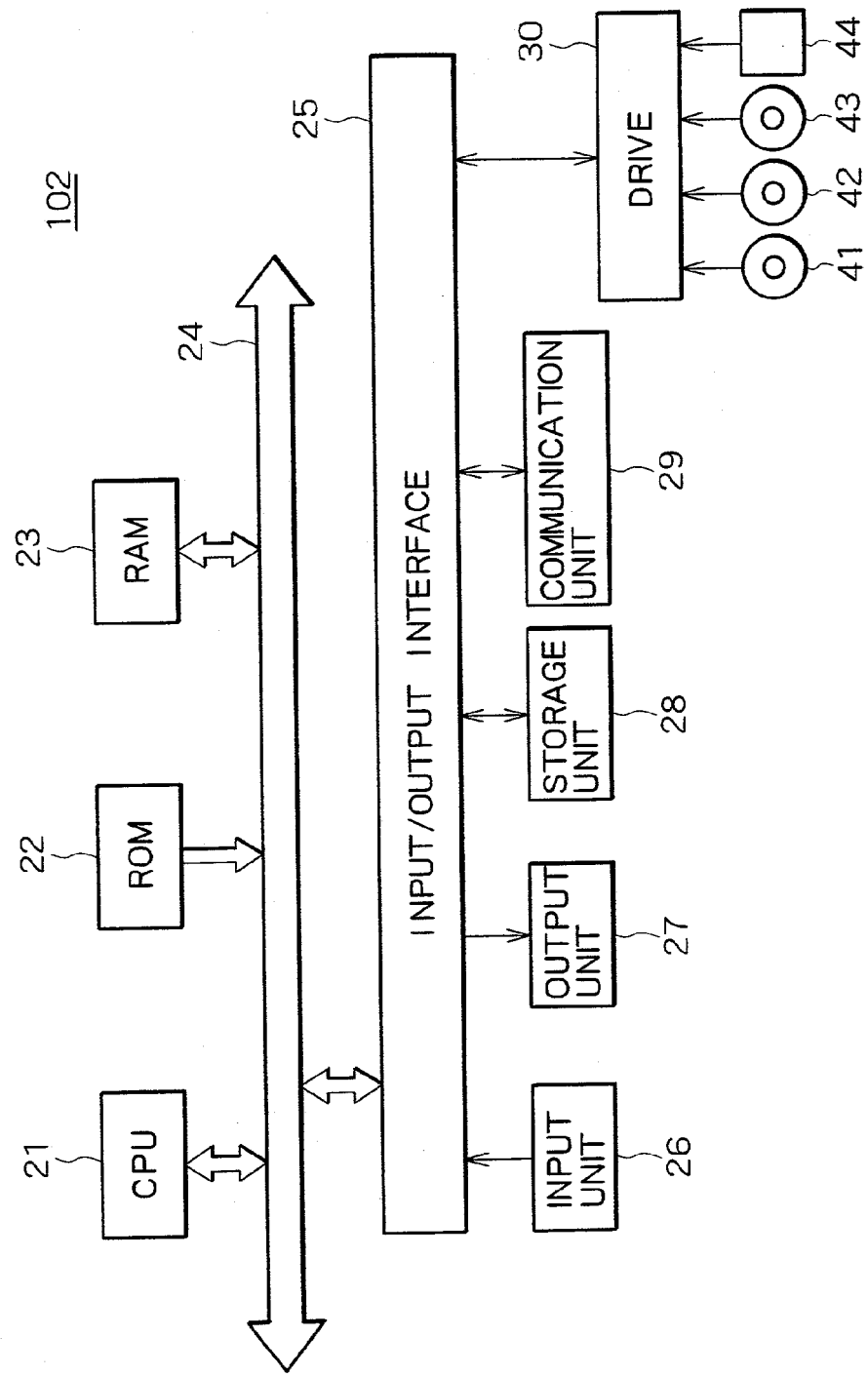
FIG. 5 is a block diagram showing the configuration of a communication control apparatus used in the network system shown in FIG. 1.

FIG. 5 is a block diagram showing the configuration of the communication control apparatus 102. In the configuration shown in FIG. 5, a CPU (Central Processing Unit) 21 carries out various kinds of processing by execution of a variety of programs stored in a ROM (Read-Only Memory) 22 or loaded from a storage unit 28 to a RAM (Random-Access Memory) 23. The RAM 23 is also used for storing information such as data required by the CPU 21 in carrying out the processing.

The CPU 21, the ROM 22 and the RAM 23 are connected to each other by a bus 24, which is also connected to an input/output interface 25.

The input/output interface 25 is connected to an input unit 26 including a keyboard and a mouse, an output unit 27 including a display unit such as a CRT or an LCD and a speaker, the aforementioned storage unit 28 such as a hard disc and a communication unit 29 including a modem and a terminal adapter. The communication unit 29 controls communications between the phone-integrated terminal 501-1 and the phone-integrated terminal 501-2 through the communication network 101.

If necessary, the input/output interface 25 is also connected to a drive 30 on which a magnetic disc 41, an optical disc 42, a magneto-optical disc 43 or a semiconductor memory 44 is mounted. If necessary, a computer program read out from the magnetic disc 41, the optical disc 42, the magneto-optical disc 43 or the semiconductor memory 44 is installed in the storage unit 28.

Figure 6:
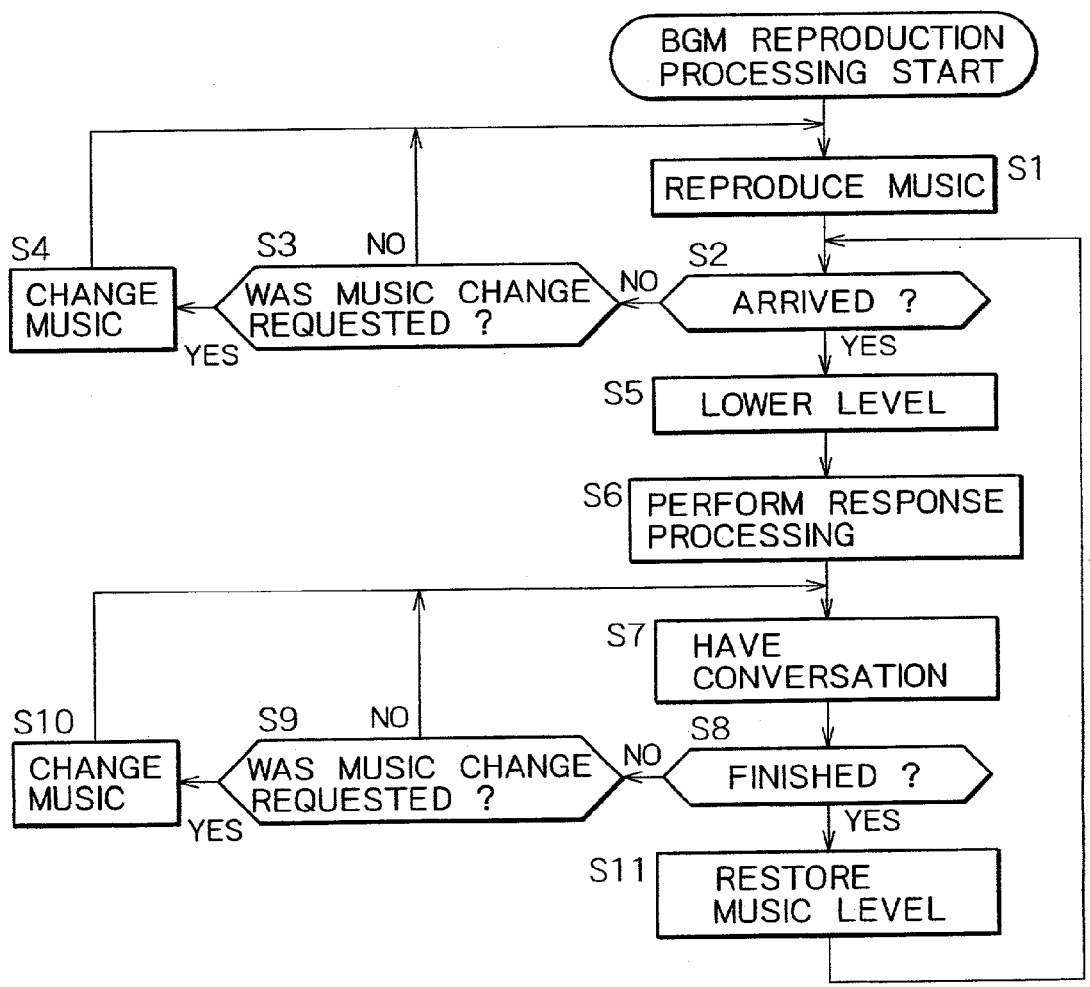
FIG. 6 is a flowchart representing BGM reproduction processing carried out by the phone-integrated terminal used in the network system shown in FIG. 1.

The phone-integrated terminal 501-1 is capable of not only having a phone conversation with a communication partner, but also reproducing music as BGM (background music) in the course of a phone conversation. By referring to a flowchart shown in FIG. 6, the following description explains processing of having a phone conversation with a communication partner and reproducing music.

As shown in the figure, the flowchart begins with a step S1 at which the CPU 601 employed in the phone-integrated terminal 501-1 reads out musical data from the memory card 2 through the interface 609 in accordance with a command received from the input unit 605 and outputs the data to the earphones employed in the audio reproduction unit 607. The earphones themselves are shown in none of the figures. Thus, the user can enjoy the music while walking.

Then, at the next step S2, the CPU 601 forms a judgment as to whether or not a phone call has arrived from a communication partner. If no phone call has arrived, the flow of the processing goes on to a step S3 to form a judgment as to whether or not a change to the music being reproduced has been requested. If no change to the music being reproduced has been requested, the flow of the processing goes back to the step S1 to repeat the processing at the step and the subsequent steps.

If the outcome of the judgment formed at the step S3 indicates that a change to the music being reproduced has been requested, that is, the user has operated the input unit 605 to request that the music being reproduced currently be changed, on the other hand, the flow of the processing goes on to a step S4 at which the CPU 601 controls the memory card 2 through the interface 609 to reproduce a newly specified piece of music. Then, the flow of the processing goes back to the step S1 to repeat the processing at the step and the subsequent steps.

It should be noted that the processing carried out at the step S4 includes processing to reproduce a first specified piece of music for a case in which no piece of music has been reproduced so far.

If the outcome of the judgment formed at the step S2 indicates that a phone call has arrived from a communication partner, on the other hand, the flow of the processing goes on to a step S5 at which the CPU 601 lowers the level of the music reproduced and output to the earphones to a level determined in advance. However, the predetermined level is not 0. Thus, the user can enjoy the music as BGM in the course of a phone conversation. That is to say, the user can hear both the voice of the communication partner and the sound of the music at the same time.

Then, at the next step S6, the CPU 601 carries out processing in response to the incoming phone call from the communication partner. To put it concretely, the CPU 601 controls the communication unit 608 to respond to the incoming phone call received from the communication partner through the communication network 101.

Subsequently, at the next step S7, the CPU 601 carries out conversation processing. To put it in detail, at that time, an audio signal input to the microphone 311 of the input unit 605 is transmitted to the phone-integrated terminal 501 of the communication partner from the communication unit 608 by way of the communication network 4. In addition, audio data transmitted by the communication partner received by the communication unit 608 is output to the speaker 307 or the earphones in the audio reproduction unit 607. Thus, the user can have a phone conversation with the communication partner. As described above, at that time, the user can hear the voice of the communication partner and music at the same time.

Then, at the next step S8, the CPU 601 forms a judgment as to whether or not a command to end the conversation has been received. If such a command has not been received, the flow of the processing goes on to a step S9 to form a judgment as to whether or not a change to the music being reproduced has been requested. If no change to the music being reproduced has been requested, the flow of the processing goes back to the step S7 to repeat the processing at the step and the subsequent steps.

If the outcome of the judgment formed at the step S9 indicates that a change to the music being reproduced has been requested, on the other hand, the flow of the processing goes on to a step S10 at which the CPU 601 changes the music. Then, the flow of the processing goes back to the step S7 to repeat the processing at the step and the subsequent steps.

The processing carried out at the steps S9 and S10 is the same as that carried out at the steps S3 and S4. In this way, the user can change the music being reproduced from the memory card 2 if necessary in the course of a phone conversation.

If the outcome of the judgment formed at the step S8 indicates that a command to end the conversation has been received, on the other hand, the flow of the processing goes on to a step S11 at which the CPU 601 controls the audio reproduction unit 607 to restore the reproduction level of music currently being reproduced to the original level. Then, the flow of the processing goes back to the step S2 to repeat the processing at the step and the subsequent steps.

Since music can be reproduced as BGM while a phone conversation is going on as described above, the user can enjoy the conversation more.

In addition, the CPU 601 is also capable of superposing an audio signal reproduced from the memory card 2 on an audio signal input by the microphone 311 in the conversation processing carried out at the step S7 in accordance with a command entered by the user via the input unit 605 and transmitting the audio signals superposed on each other to the communication partner. Since music is also transmitted to the communication partner in this case, the communication partner will get an impression as if the phone call were made in a coffee shop or the like.

Furthermore, with the phone-integrated terminal 501 provided by the present invention, musical data recorded on the memory card 2 can be transmitted to a communication partner during a phone conversation to be copied by the communication partner. Such processing is explained by referring to a flowchart shown in FIG. 7. This processing is carried out during a phone conversation.

As shown in the figure, the flowchart begins with a step S21 at which the CPU 601 carries out processing to start a phone conversation with a communication partner. Then, at the next step S22, the CPU 601 reads out titles of music recorded on the memory card 2 and transmits the titles to the communication partner.

In the phone-integrated terminal 501 of the communication partner, the titles of music are displayed on the liquid-crystal display screen 308. Then, if desired, the user on the communication partner side specifies the title of music the user wants to listen to so that the music can be transmitted to the communication partner. A specified title is transmitted to the other phone-integrated terminal 501.

The processing carried out by the phone-integrated terminal 501 of the communication partner to display received titles and select one of the titles is also carried out by the other phone-integrated terminal 501 at steps S25 to S29, which will be described in detail below.

At a step S23, the CPU 601 forms a judgment as to whether or not the title of music to be transmitted to the communication partner as desired by the communication partner has been received from the communication partner. If the outcome of the judgment indicates that the title of such music has been received, the flow of the processing goes on to a step S24 at which data of the music having the received title is read out from the memory card 2 and transmitted to the communication partner. At that time, the CPU 601 adds a flag to the transmitted content data. The flag indicates that the musical data currently being reproduced is being transmitted. As will be described later, this flag is recognized by the communication control apparatus 102 at a step S52 of a flowchart shown in FIG. 11. An accounting process is carried out in dependence with the outcome of a judgment formed at this step.

If the outcome of the judgment formed at the step S23 indicates that the title of music to be transmitted to the communication partner as desired by the communication partner has not been received from the communication partner, the processing of a step S24 is skipped.

Then, at the next step S25, the CPU 601 forms a judgment as to whether or not titles of music stored in the memory card 2 of the communication partner have been transmitted from the communication partner. If titles of music stored in the memory card 2 of the communication partner have been transmitted from the communication partner, the flow of the processing goes on to a step S26 at which the CPU 601 outputs the received music titles on the liquid-crystal display screen 308 to be displayed thereon. The user then looks at the display and specifies a the title of desired music by operating the input unit 605 if transmission of the music from the communication partner is desired.

Then, at the next step S27, the CPU 601 forms a judgment as to whether or not the user has specified a title of desired music for transmission from the communication partner. If the user has specified the title of such music, the flow of the processing goes on to a step S28 at which the communication partner is notified of the title.

When the communication partner is notified of the title of music, the phone-integrated terminal 501 of the communication partner transmits data of the music by carrying out the same processing as that of the step S24.

Then, at a step S29, the CPU 601 of the phone-integrated terminal 501 receives the data of the music from the communication partner and records the data onto the memory card 2 through the interface 609. Then, the flow of the processing goes on to a step S30.

When musical data held in the phone-integrated terminal 501 of the communication partner is transmitted from the phone-integrated terminal 501 of the communication partner and stored in this way, the musical data is in essence copied so that a copying fee is added to the charge of the phone communication conducted by itself at a step S53 of the flowchart shown in FIG. 11 as described later.

If the outcome of the judgment formed at the step S25 indicates that no titles of music stored in the memory card 2 of the communication partner have been transmitted from the communication partner or the outcome of the judgment formed at the step S27 indicates that the user has not specified a title of desired music for transmission from the communication partner, on the other hand, the flow of the processing goes on to the step S30 to form a judgment as to whether or not processing to end the phone conversation has been carried out.

To be more specific, at the step S30, the CPU 601 forms a judgment as to whether or not a command to end the phone conversation has been received. If such a command has not been received, the judgment is formed repeatedly till the command is received. As the command is received, the flow of the processing goes on to a step S31 at which the phone conversation is ended.

Figure 8:
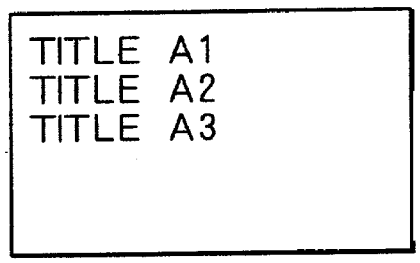
FIG. 8 is a diagram showing a typical display of titles.
Figure 9:
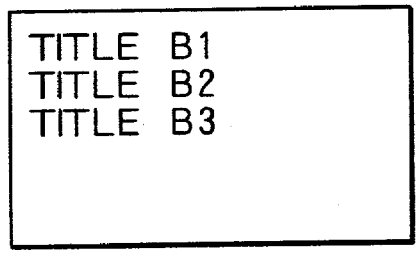
FIG. 9 is a diagram showing another typical display of titles.
Figure 10:
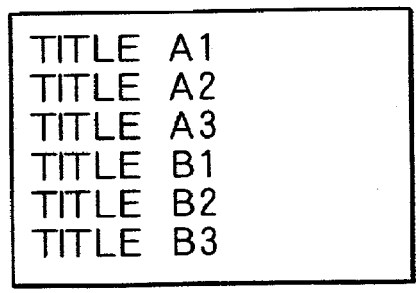
FIG. 10 is a diagram showing a further typical display of titles.

As described above, assume for example that user A of the phone-integrated terminal 501-1 has recorded musical data with titles A1, A2 and A3 in a mounted memory card 2 as shown in FIG. 8 whereas user B of the phone-integrated terminal 501-2 has recorded musical data with titles B1, B2 and B3 in a mounted memory card 2 as shown in FIG. 9. The users each desire to receive all pieces of musical data that are not available in its memory card 2. When all the pieces of musical data that are not available are received, the users each have musical data with titles A1, A2, A3, B1, B2 and B3 recorded in a mounted memory card 2 as shown in FIG. 10.

Figure 11:
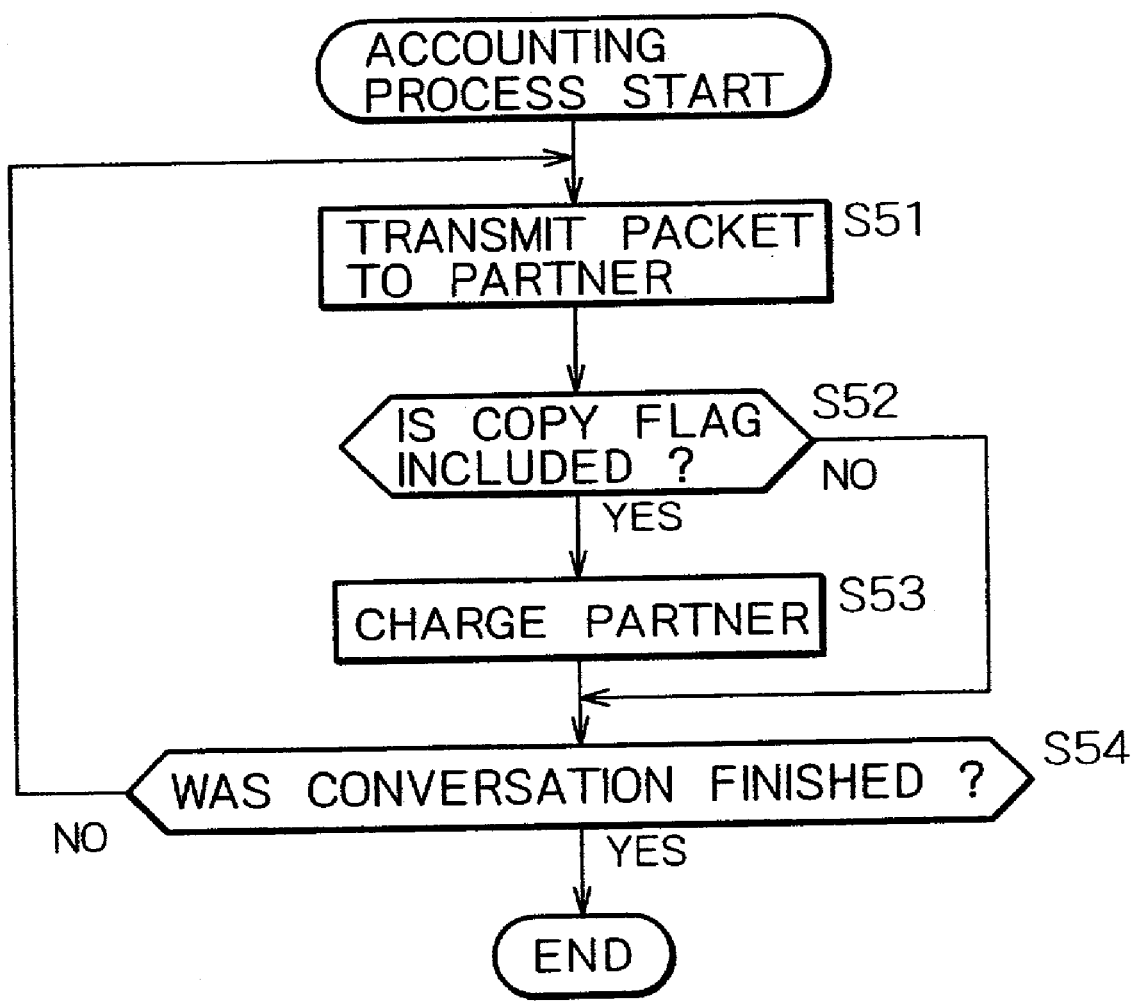
FIG. 11 is a flowchart representing an accounting process carried out by the communication control apparatus used in the network system shown in FIG. 1.

FIG. 11 is a flowchart representing processing, which is carried out by the communication control apparatus 102 when musical data is copied during a phone conversation.

Figure 7:
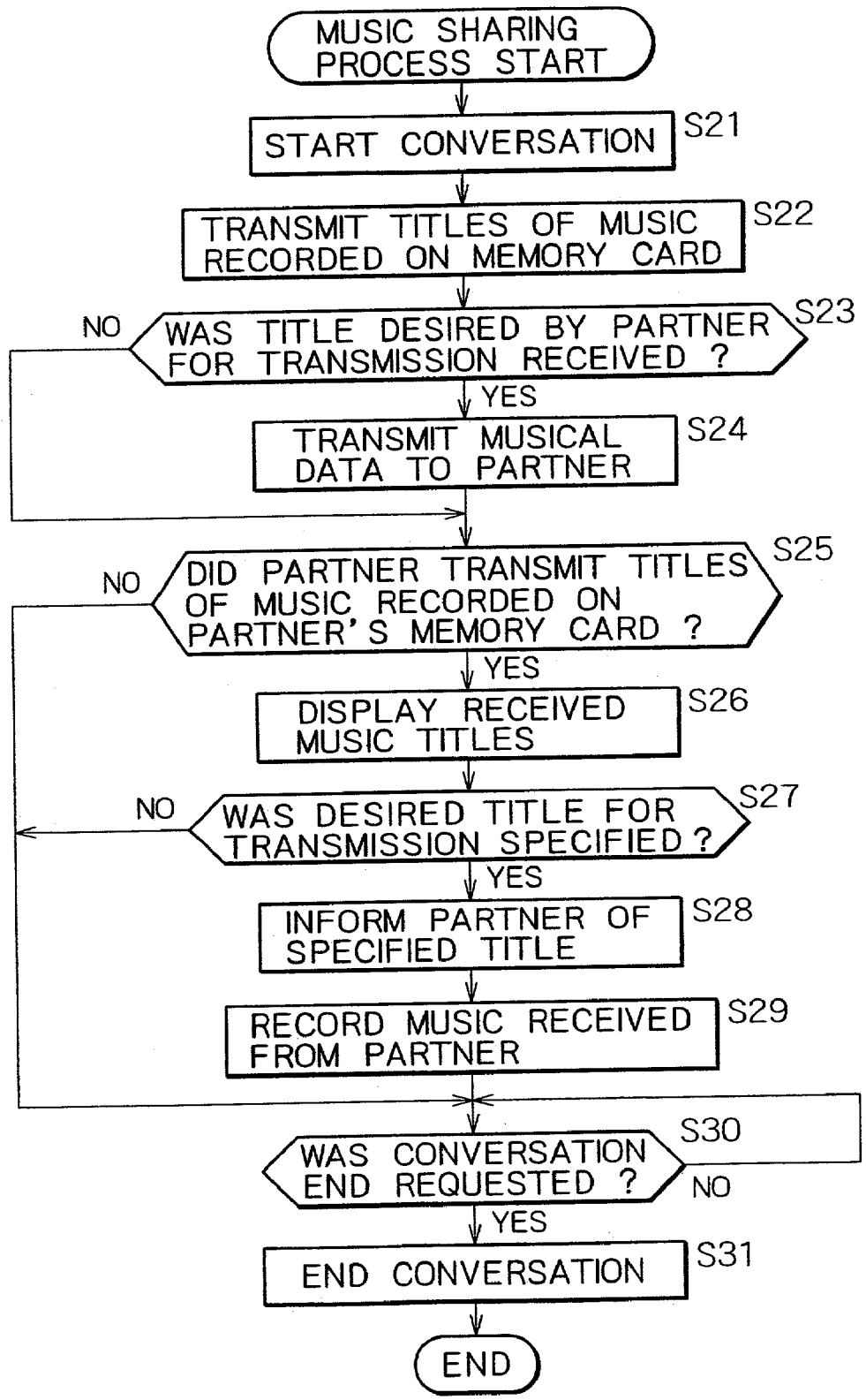
FIG. 7 is a flowchart representing music sharing processing carried out by the phone-integrated terminal used in the network system shown in FIG. 1.

As shown in the figure, the flowchart begins with a step S51 at which the CPU 21 employed in the communication control apparatus 102 carries out processing to transfer a received packet to a communication partner. Then, the flow of the processing goes on to a step S52 to form a judgment as to whether or not the transferred packet includes a copy flag. To put it in detail, the packet transmitted at the step S24 of the flowchart shown in FIG. 7 is examined to determine whether the packet includes a flag inserted at the same step. If a copy flag is included, the flow of the processing goes on to a step S53 at which the CPU 21 carries out an accounting process for the transmission destination (or the transfer source). Later on, the fee calculated in the accounting process is added to a phone-call charge of the user.

If the outcome of the judgment formed at the step S52 indicates that the copy flag is not included in the packet, on the other hand, the accounting process of the step S53 is skipped.

Then, at the next step S54, the CPU 21 forms a judgment as to whether or not the telephone conversation has been ended. If the telephone conversation has not been ended, the flow of the processing goes back to the step S51 to repeat the processing of the step and the subsequent steps. If the telephone conversation has been ended, on the other hand, the processing is finished.

In the above description, the phone-integrated terminal 501 is taken as an example. However, the scope of the present invention is not limited to the phone-integrated terminal 501. For example, the present invention can also be applied to a cellular phone, a PDA (Personal Digital Assistant), a digital video cassette recorder having a communication function and a photographing function, an electronic notebook device having a communication function and a portable personal computer having a communication function to name a few.

In addition, a content in the above description is musical data. However, a content is not limited to musical data.

The processing sequence described above can be implemented by hardware or software. If the sequential processing is implemented by software, programs composing the software are installed from a program storage medium in a computer including embedded dedicated hardware or another computer such as a general-purpose personal computer capable of carrying out a variety of functions by execution of a variety of programs installed in the personal computer.

As shown in FIGS. 4 and 5, the program storage medium for recording programs to be installed in the computer including embedded dedicated hardware or the general-purpose personal computer in a state of being executable by the computer or the personal computer can be a package medium such as the magnetic disc 641 or 41 including a floppy disc, the optical disc 642 or 42 including a CD-ROM (Compact-Disc Read-Only Memory) and a DVD (Digital Versatile Disc), the magneto-optical disc 643 or 43 including an MD (Mini-Disc) or the semiconductor memory 644 or 44. The programs can also be stored temporarily or permanently in advance in a nonvolatile memory such as the ROM 602 or 22. As another alternative, a program can be installed in the program storage medium from a wire or radio communication media such as a local-area network, the Internet or a digital satellite broadcasting system, if necessary, through the communication unit 608 or 29.

It should be noted that, in this specification, steps composing a program recorded in a program storage medium include mainly pieces of processing to be executed sequentially in accordance with a predetermined order along the time axis. However, the steps are not necessarily the pieces of processing to be executed sequentially. Instead, the steps may include pieces of processing to be executed concurrently or individually.

In addition, the technical term "network system" used in this specification means the entire system including a plurality of apparatus.

While a preferred embodiment of the present invention has been described using specific terms, such description is for illustrative purposes only, and it is to be understood that changes and variations may be made without departing from the spirit or scope of the following claims.

What is claimed is:

1. A phone-call apparatus comprising:
   storage means for storing content data;
   phone-conversation means for implementing a phone conversation with a communication partner;
   reproduction means for reproducing said content data stored in said storage means; and
   control means for controlling a reproduction level of a content reproduced by said reproduction means by adjusting the reproduction level to make both a voice of said partner and a reproduction sound of said content audible during a conversation by said phone-conversation means and by restoring the reproduction level when said conversation ends.

2. The phone-call apparatus according to claim 1, wherein said phone-conversation means transmits said reproduction sound of said content to said partner.

3. The phone call apparatus according to claim 2, further comprising:
   data receiving means for transitting a title of said content to said communication partner.

4. The phone call apparatus according to claim 3, wherein said communication partner selects said content to be reproduced by said reproduction means.

5. The phone call apparatus according to claim 3, wherein said data transmission means transmits said content data to said communication partner.

6. The phone call apparatus according to claim 2, further comprising:
   data receiving means for receiving a title of a second content located at a second storage means.

7. The phone call apparatus according to claim 6, wherein said data receiving means further receives the second content located at the second storage means.

8. A phone-call method comprising:
   a storing step of storing content data;
   a phone-conversation step of implementing a phone conversation with a communication partner;
   a reproduction step of reproducing said content data stored at said storing step; and
   a control step of controlling a reproduction level of a content reproduced at said reproduction step by adjusting the reproduction level to make both a voice of said partner and a reproduction sound of said content audible during a conversation at said phone-conversation step and by restoring the reproduction level when said conversation ends.

9. The phone call method according to claim 8, further comprising:
   transmitting a title of said content data to said communication partner.

10. The phone call method according to claim 8, further comprising:
    receiving a title of a second content.

11. A program to be executed by a computer comprising:
    a storing step of storing content data;
    a phone-conversation step of implementing a phone conversation with a communication partner;
    a reproduction step of reproducing said content data stored at said storing step; and
    a control step of controlling a reproduction level of a content reproduced at said reproduction step by adjusting the reproduction level to make both a voice of said partner and a reproduction sound of said content audible during a conversation at said phone-conversation step and by restoring the reproduction level when said conversation ends.

* * * * *